(12) United States Patent
Grenier-Raud et al.

(10) Patent No.: US 9,525,995 B2
(45) Date of Patent: Dec. 20, 2016

(54) MOBILE DEVICE WITH IMPROVED NETWORK SELECTION WHILE ROAMING

(71) Applicant: Apple Inc., Cupertino, CA (US)

(72) Inventors: Emmanuel Grenier-Raud, Paris (FR); Gaurav Khanna, Milpitas, CA (US); Harshit Chuttani, Newark, CA (US); I-Chun Fang, San Jose, CA (US); Thanigaivelu Elangovan, Santa Clara, CA (US); Yifan Zhu, San Jose, CA (US); Rajesh Ambati, Los Altos Hills, CA (US); Lakshmi N. Kavuri, San Jose, CA (US); Gaurav Arya, San Jose, CA (US); Sindhu Sivasankaran Nair, Walnut Creek, CA (US); Madhusudan Chaudhary, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/732,765

(22) Filed: Jun. 7, 2015

(65) Prior Publication Data
US 2016/0330606 A1 Nov. 10, 2016

Related U.S. Application Data

(60) Provisional application No. 62/156,940, filed on May 5, 2015.

(51) Int. Cl.
*H04W 8/06* (2009.01)
*H04W 60/00* (2009.01)
(Continued)

(52) U.S. Cl.
CPC .............. *H04W 8/065* (2013.01); *H04W 48/16* (2013.01); *H04W 60/005* (2013.01); *H04W 60/02* (2013.01); *H04W 88/06* (2013.01)

(58) Field of Classification Search
CPC ...... H04W 48/18; H04W 48/16; H04W 88/06; H04W 28/18; H04W 48/02; H04W 84/042; H04W 36/0022
See application file for complete search history.

(56) References Cited

U.S. PATENT DOCUMENTS

| 8,121,633 B2 | 2/2012 | Cormier et al. |
| 8,700,037 B2 | 4/2014 | Hietalahti et al. |

(Continued)

*Primary Examiner* — Nizar Sivji
(74) *Attorney, Agent, or Firm* — Meyertons Hood Kivlin Kowert & Goetzel, P.C.; Jeffrey C. Hood; Matthew C. Washburn

(57) ABSTRACT

Apparatuses, systems, and methods for user equipment (UE) devices to perform a radio access technology (RAT) upgrade. A UE may initiate a background scan to upgrade RAT while camped on a first system in response to an occurrence of a first condition. The first system may include a first PLMN that operates according a first RAT. The UE may determine a second system operates according to a second RAT that provides upgraded service as compared to the first RAT. The second system may be included in one or more systems found during the background scan. The UE may attempt to register on the second system based on the second PLMN operating according to the second RAT. The first and second PLMNs may each have an associated operator preference and the first PLMN may be preferred over the second PLMN.

23 Claims, 8 Drawing Sheets

(51) Int. Cl.
*H04W 60/02* (2009.01)
*H04W 48/16* (2009.01)
*H04W 88/06* (2009.01)

(56) References Cited

U.S. PATENT DOCUMENTS

| | | | |
|---|---|---|---|
| 8,761,138 B2 | 6/2014 | Moisanen et al. | |
| 2004/0224684 A1* | 11/2004 | Dorsey | H04W 48/16 455/434 |
| 2005/0096053 A1* | 5/2005 | Liu | H04B 17/382 455/439 |
| 2008/0200169 A1* | 8/2008 | Gao | H04W 48/16 455/434 |
| 2012/0202480 A1* | 8/2012 | Franklin | H04W 24/10 455/423 |
| 2012/0320879 A1* | 12/2012 | Martin | H04W 36/0094 370/332 |
| 2014/0235237 A1* | 8/2014 | Shin | H04W 48/16 455/434 |
| 2014/0378140 A1 | 12/2014 | Gopal et al. | |
| 2015/0085841 A1* | 3/2015 | Sadek | H04W 72/1215 370/336 |
| 2015/0139053 A1* | 5/2015 | Van Lieshout | H04W 52/0216 370/311 |
| 2015/0350965 A1* | 12/2015 | Kabadi | H04W 36/0022 370/331 |

\* cited by examiner

MOBILE DEVICE WITH IMPROVED NETWORK SELECTION WHILE ROAMING

PRIORITY DATA

This application claims benefit of priority to U.S. Provisional Application Ser. No. 62/156,940, titled "Mobile Device with Improved Network Selection while Roaming", filed May 5, 2015, whose inventors are Emmanuel Grenier-Raud, Gaurav Khanna, Harshit Chuttani, I-Chun Fang, Thanigaivelu Elangovan, Yifan Zhu, and Rajesh Ambati, which is hereby incorporated by reference in its entirety as though fully and completely set forth herein.

FIELD

The present application relates to wireless devices, and more particularly to an apparatus, system, and method for wireless devices to perform system selection based on a preferred RAT while roaming.

DESCRIPTION OF THE RELATED ART

Wireless communication systems are rapidly growing in usage. Further, wireless communication technology has evolved from voice-only communications to also include the transmission of data, such as Internet and multimedia content. In certain scenarios a wireless device may use a search algorithm to acquire service with a wireless network. These search algorithms may burden device resources. Thus, improvements in the field are desired.

SUMMARY

Embodiments are presented herein of methods for wireless devices to more efficiently scan frequency bands for potential base stations and of devices configured to implement these methods. Embodiments relate to a user equipment (UE) device having at least one antenna for performing wireless communications, a radio, and a processing element coupled to the radio. The UE may perform voice and/or data communications, as well as the methods described herein.

According to the techniques described herein, the UE may initiate a background scan to upgrade RAT while camped on a first system in response to an occurrence of a first condition. The first system may include a first PLMN that operates according a first RAT. The UE may determine a second system operates according to a second RAT that provides upgraded service as compared to the first RAT. The second system may be included in one or more systems found during the background scan. The UE may attempt to register on the second system based on the second PLMN operating according to the second RAT. The first and second PLMNs may each have an associated operator preference and the first PLMN may be preferred over the second PLMN.

Further, according to the techniques described herein, the UE may determine, based on a comparison of a current system on which the UE is camped to a preferred system list stored on the UE, that there is at least one higher priority system in the preferred system list. Additionally, the UE may compare a first radio access technology (RAT) of the current system to a second RAT of the at least one higher priority system, and in response to determining that the first RAT is preferred compared to the second RAT, continue to camp on the current system without initiating a background scan for the higher priority system.

In addition, according to the techniques described herein, the UE may determine that a lower priority system that uses a first RAT is preferred over a higher priority system that uses a second RAT based on a comparison of the first and second RATs where priorities of the systems are based at least in part on a preferred system list stored on the UE. The UE may continue to camp on the lower priority system without initiating a background scan for the higher priority system in response to determining that the lower priority system is preferred.

According to other techniques described herein, the UE may determine that a first RAT on a current system the UE is camped on is less preferred than one or more other RATs and perform a scan only for systems using a more preferred second RAT. The UE may register the UE on the at least one system using the more preferred second RAT in response to finding at least one system comprising the more preferred second RAT. Additionally, the UE may reselect to a third RAT that is preferred over the second RAT.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
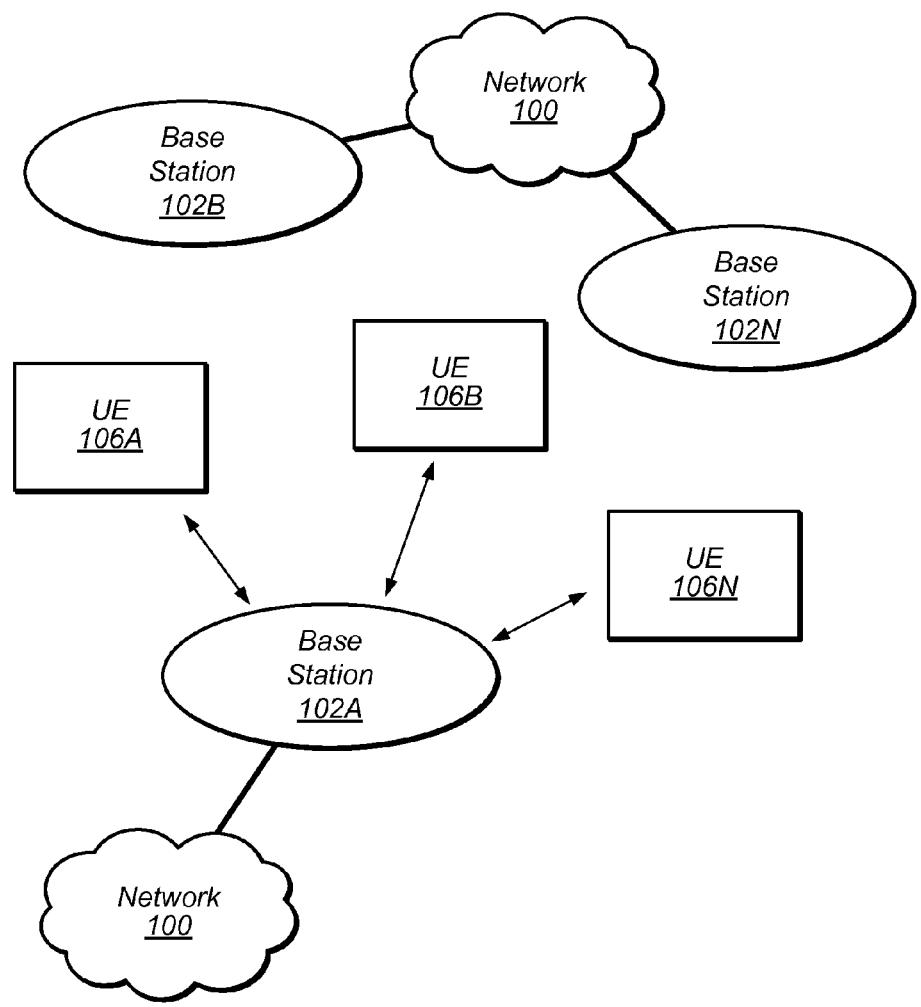
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112(f) interpretation for that component.

Figure 2:
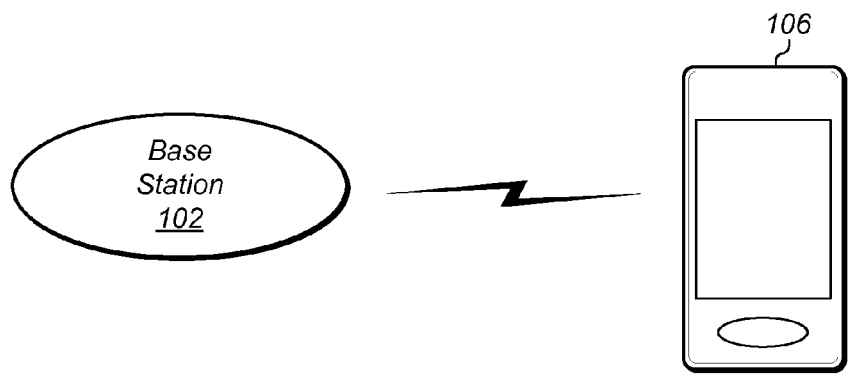
FIG. 2 illustrates a base station (BS) in communication with a user equipment (UE) device according to some embodiments.

FIGS. 1 and 2—Communication System

FIG. 1 illustrates a simplified example wireless communication system, according to one embodiment. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to one embodiment. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
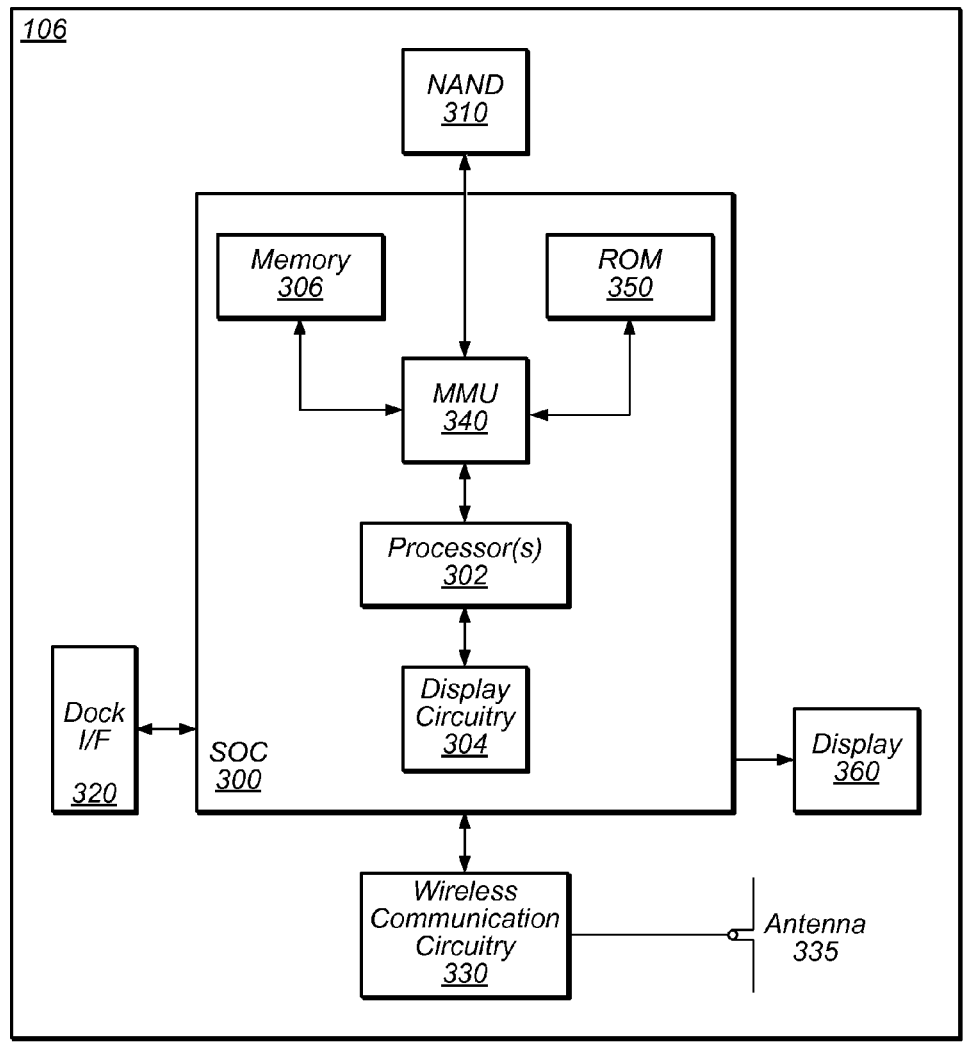
FIG. 3 illustrates an example block diagram of a UE according to some embodiments.

FIG. 3—Block Diagram of a UE

FIG. 3 illustrates an example block diagram of a UE 106, according to one embodiment. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, GPS, etc.).

As shown, the UE device 106 may include at least one antenna (and possibly multiple antennas, e.g., for MIMO and/or for implementing different wireless communication technologies, among various possibilities) for performing wireless communication with base stations, access points, and/or other devices. For example, the UE device 106 may use antenna 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

As described herein, the UE 106 may include hardware and software components for implementing features for performing more efficient cellular base station scanning, such as those described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein.

Figure 4:
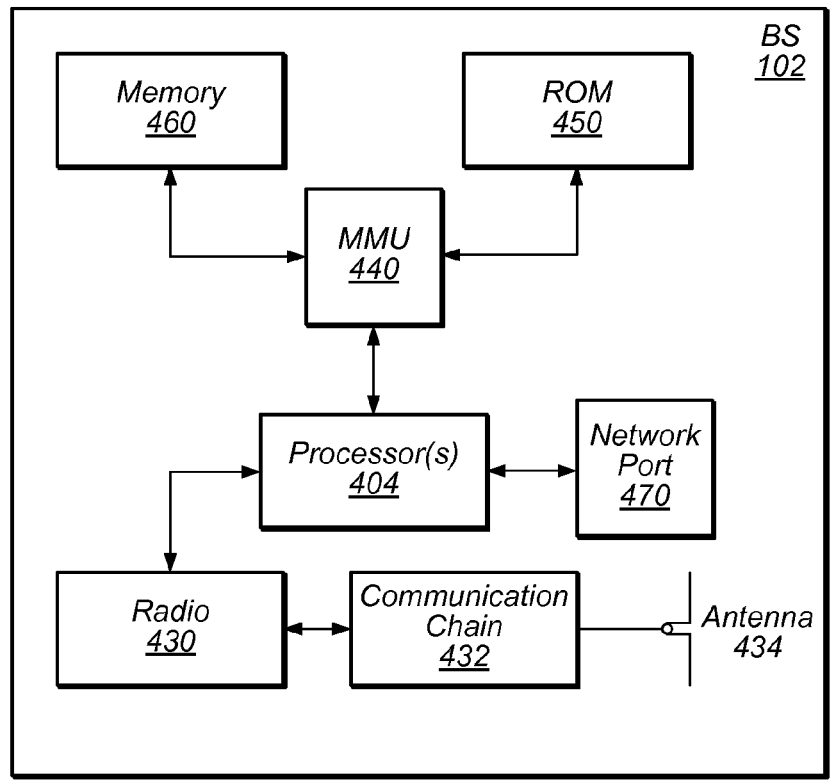
FIG. 4 illustrates an example block diagram of a BS according to some embodiments.

FIG. 4—Block Diagram of a Base Station

FIG. 4 illustrates an example block diagram of a base station 102, according to one embodiment. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Background PLMN Selection to Upgrade RAT while Roaming

In some existing implementations, if a UE registers on a public land mobile network (PLMN) with service on a second generation (2G) radio access technology (RAT) (e.g., GSM/GPRS/EDGE), the UE may have a poor user experience as compared to third generation (3G) or fourth generation (4G) RATs (e.g., WCDMA for 3G and LTE or LTE-A for 4G). The poor user experience may be due to lengthened data downloads and uploads. In addition, the extended duration for data uploads and downloads for 2G RATs as compared to 3G or 4G RATs may result in higher battery drain. In other words, the cost of energy spent per bit received from the network and sent to the network is higher for 2G RATs as compared to 3G or 4G RATs.

In addition, the need for background scans may be determined on a periodic basis (e.g., as defined by a SIM timer or as specified by an operator and stored on a SIM card or UICC of the UE) based on priority of currently camped system in an operator controlled PLMN selector with access technology data structure, e.g., list and/or parameter (e.g., EF_OPLMNwACT). Note that in some embodiments the data structure may be specified by a network operator and may include non-operator networks with which the operator has roaming agreements. The data structure may include a list of (PLMN, RAT type) pairs. The PLMNs may be listed in decreasing order of priority (without regard to RAT type), meaning the first PLMN has the highest priority. Thus, if there are higher priority PLMNs in the data structure, a scan may be attempted to move to a higher priority PLMN without consideration for RAT type (either on current PLMN or on higher priority PLMN). Thus, in some instances, the background scan may be triggered and result in a decrease in RAT type (e.g., moving from 3G to 2G or 4G to 3G) because a higher priority PLMN exists in the data structure. However, as noted above, the extended duration for data uploads and downloads for 2G RATs as compared to 3G or 4G RATs may result in higher battery drain and decreased user experience.

Thus, embodiments described herein provide a mechanism for background scans to be attempted even when camped on the highest priority system. In other words, embodiments as described herein may allow a UE to use background scanning in order to upgrade RATs.

Figure 5:
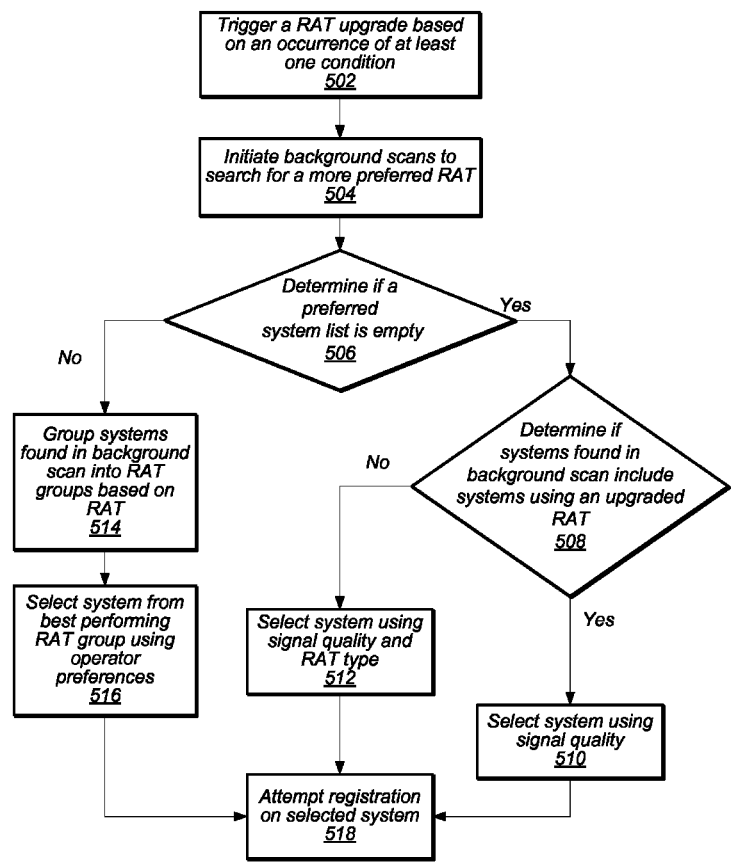
FIG. 5 is a flowchart diagram illustrating one embodiment of a method performed by a UE to perform a RAT upgrade while roaming.

FIG. 5—Flowchart Diagram

FIG. 5 is a flowchart diagram illustrating one embodiment of a method performed by a UE to perform a RAT upgrade. The method shown in FIG. 5 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 502, the UE (e.g., UE 106) may initiate a RAT upgrade based on an occurrence of at least one condition. In other words, there may be at least one condition that causes the UE to perform a RAT upgrade. The at least one condition may include detecting that the UE is in a roaming condition (e.g., a roaming country or non-home country), that the UE is operating in an automatic PLMN selection mode, that the UE has a data roaming setting enabled, and/or that the UE has successfully registered on a 2G (e.g., GSM/GPRS/EDGE) visiting PLMN (VPLMN), among other conditions. Note that in some embodiments, initiation of the RAT upgrade may be based on the occurrence of multiple conditions (i.e., a plurality of conditions) and/or a set of conditions. In some embodiments, the UE may use a default (or conventional) PLMN selection logic to initially camp in a roaming network (e.g., a VPLMN). For example, PLMN selection may be either operator PLMN (OPLMN) list based or PLMNs may be selected based on signal quality (e.g., the UE may generate a list of PLMNs based on signal quality and attempt to register with a PLMN with a highest or best signal quality first).

In some embodiments, the RAT upgrade may be performed using a background scan mechanism. The background scans may be at least partially based on or use a portion of an operator preferred data structure. The data structure may include a prioritized system list. A system may be defined by PLMN and RAT type, thus a system may appear in the data structure as a (PLMN, RAT type) pair. For example, an EF_OPLMNwACT includes data pairs (PLMN, access technology). The data structure may be an OPLMN list defined in a UICC(s) (Universal Integrated Circuit Card(s)) and/or SIM card of the UE. The data structure may be used to generate a preferred system list such that it may be determined whether the current serving system (PLMN, RAT type) is of lower priority than the preferred system based on the preferred system list.

In some embodiments, the UE may start a PLMN scan timer if at least one higher priority PLMN exists in the data structure and/or if the UE is camped on a 2G visiting PLMN. For example, the UE may start an HP-PLMN timer if at least one higher priority PLMN exists in an OPLMN list (e.g., EF_OPLMNwACT) and/or if the UE is camped on a 2G VPLMN. Further, upon expiration of the PLMN scan timer, the UE may proceed to initiate a background scan (e.g., an HP-PLMN background scan) at 504.

At 504, the UE may initiate background scans to search for a more preferred (i.e., better performing) RAT. For example, if the UE is camped on a 2G RAT, the UE may search for a 3G and/or a 4G RAT. A type of background scan may be based on whether or not a preferred system list (e.g., an OPLMN list or an EF_OPLMNwACT) is present on the UE (e.g. on a SIM card and/or a UICC of the UE). The UE may generate a list of systems (PLMN, RAT type) found based on the background scan.

At 506, the UE may determine if a preferred system list is empty. In other words, the UE may assess whether a preferred system list is stored on the UE and further determine whether the preferred system list includes entries for preferred PLMNs. For example, the UE may determine whether an OPLM list (or EF_OPLMNwACT) is present on a SIM and/or UICC of the UE and further determine whether the OPLM (or EF_OPLMNwACT) list includes any entries for systems (or PLMNs) the operator prefers. If the preferred system list is empty, the method may continue at 508. If the preferred system list is not empty, the method may continue at 514.

At 508, in response to determining that the preferred system list is empty, the UE may determine whether the systems found in the background scan include systems with an upgraded RAT compared to a RAT which the UE is camping on. Note that whether a RAT is an upgraded RAT may be based on any of various factors, including, but not limited to, maximum data transfer rates supported by the RAT. For example, a 3G RAT may be considered an upgraded RAT as compared to a 2G RAT; however, a 3G RAT may not be considered an upgraded RAT as compared to a 4G RAT. If the systems found include only upgraded RATs as compared to the current RAT, the method may continue at 510. Otherwise, the method may continue at 512.

At 510, in response to determining that the systems found include only upgraded RATs, the UE may select a system based at least partially on signal quality since each RAT in the list of systems found may be an upgraded RAT. In other words, the UE may use signal quality to determine which system to select since each system provides a RAT upgrade as compared to the current RAT.

At 512, in response to determining that the systems found include upgraded RATs and non-upgraded RATs, the UE may select a system based at least partially on RAT type and signal quality. In other words, The UE may select a RAT using both RAT type and signal quality. For example, if the system with the highest signal quality does not use an upgraded RAT (e.g., is a 2G system when the UE is camped on a 2G system or is a 3G system when the use is camped on a 3G system), the UE may select a system with a highest signal quality that also uses an upgraded RAT. Thus, in some embodiments, the UE may group the systems by RAT type and then select a system only from groups including upgraded RATs.

At 514, in response to determining that preferred system list is not empty, the UE may group systems found in the background scan using (or based on) each system's RAT type. For example, the UE may group systems operating using a 2G RAT into a first group, systems operating using a 3G RAT into a second group, and so forth. As another example, the UE may group systems based on whether the RAT of the system provides an upgrade over the UE's current RAT. Thus, the UE may generate a first group including RATs that are a downgrade as compared to the current RAT, a second group including RATs that are the same as the current RAT, and a third group including RATs that are an upgraded as compared to the current RAT. Note that in some embodiments, the first and second groups may be combined (i.e., systems with RATs that are a downgrade may be included in a group with systems that use the same RAT as the UE's current RAT).

At 516, the UE may select a system from a group that includes upgraded RATs based on (or using) the preferred system list. For example, if the UE is camped on a 2G system, the UE may select from a group of systems using either 3G or 4G RATs, using the preferred system list (e.g. an OPLMN list). Note that each system may have an associated operator preference and the 2G system may be preferred over a 3G or 4G system the UE selects. As another example, if the UE is camped on a 3G system, the UE may select from a group of systems using 4G RATs using (or based on) the preferred system list. In other words, the UE may select a system that is included in both the preferred system list and upgraded RAT group. In some embodiments, the UE may not consider whether a system has a higher operator preference than a current system on which the UE is camping. In some embodiments, the selection may be random or may be based on one or more factors (or criterion), such as signal strength or signal quality.

At 518, the UE may attempt to register on the selected system. If the attempt is successful, the UE will be camped on an upgraded RAT. If the registration is unsuccessful, the UE may return to its current system and select another system to attempt to register on according to the methods described above.

In some embodiments, if the attempt to register is successful and the preferred system list is empty, the scan timer (e.g., an HP_PLMN scan timer) may be stopped. Alternatively, if the attempt to register is successful and the preferred system list is not empty, the UE may block attempts to move to higher priority systems operating on a RAT that would be a downgrade as compared to the RAT of the system the UE successfully registered on as described in further detail below in reference to FIG. 6.

In addition to upgrading RAT, embodiments may also ensure that paging performance is not reduced and/or compromised and that power cost of the RAT upgrade does not exceed benefits achieved by operating on the upgraded RAT. For example, in some embodiments, since foreground registration attempts (i.e., attempting to register on selected system as described above at 518) may have potential impact on paging performance. Thus, in order to limit the impact on paging performance, the UE may stagger registration attempts. For example, the UE may attempt to register only one PLMN per upgrade period (e.g., per a time specified in a parameter such as T_RATUpgrade)

As another example, in embodiments in which the preferred system list is empty (or not present), power cost associated with blind scans (i.e., background scans triggered without knowledge of whether systems with upgraded RATs are within range of the UE) may be mitigated by limiting a number of background scans attempted over a specified time period. For example, RAT upgrade attempts may be limited to N_MaxUpgrades per T_BackoffPeriod, where N_MaxUpgrades and T_BackoffPeriod may be configurable.

In addition, to mitigate power cost associated with blind scans, the UE may query location data in order to determine if systems with upgraded RATs are within range of a location of the UE prior to triggering a RAT upgrade attempt.

In some embodiments, a maximum number of RAT upgrade attempts may be based on a both N_MaxUpgrades and a maximum number of unique systems available as determined by location data. Thus, for example, the maximum number of RAT upgrade attempts may be a minimum of N_MaxUpgrades and the maximum number of unique systems available as determined by location data.

In some embodiments, RAT upgrade attempts may be staggered across time and/or location. For example, the UE may use motion status in determining whether to attempt (or re-attempt) a RAT upgrade. In other words, the UE may base whether or not to attempt (or re-attempt) a RAT upgrade procedure as described herein on motion status of the UE. Thus, if the UE determines it is stationary, approximately stationary, or slow moving (e.g., the UE has not approximately changed location over a specified period of time), the UE may not attempt a maximum number of RAT upgrades (e.g., N_MaxUpgrades) over the specified time period (e.g., T_BackoffPeriod). Said another way, the UE may save RAT upgrade attempts opportunistically based on location and/or motion status of the UE. Thus, the UE may skip RAT upgrade attempts until the UE detects movement, possibly to a new PLMN or system (e.g., a new VPLMN).

In some embodiments, the UE may not search bands not supported in a current location. For example, if the UE determines using, or based on, location information of the UE that certain bands are not supported at the current location of the UE, the UE may exclude those bands in backgrounds scans triggered for a RAT upgrade.

In some embodiments, if a registration attempt is rejected by a selected system, the UE may not re-attempt registration on the selected system for a specified period of time. The specified period of time may be configurable. In some embodiments, the UE may base whether or not to re-attempt registration after rejection on whether the selected system is of a lower priority than the currently camped system as specified by a preferred system list on the UE. For example, if the selected system is a lower priority than the currently camped system as defined by EF_OPLMNwACT the UE may not re-attempt registration on the selected system if initially rejected. Additionally, or alternatively, in some embodiments, is the selected system is not part of the preferred system list (e.g., an OPLMN list, the UE may not re-attempt registration after rejection.

In some embodiments, if the UE determines that the selected system (i.e., PLMN, RAT type pair) has a PLMN that is common to the currently camped system, the UE may not attempt registration and may rely on a PLMN re-selection process to upgrade RATs within the currently camped system.

In some embodiments, the UE may trigger a RAT upgrade only when the UE is registered on a 2G system. In such embodiments, the UE may limit background scans to search for 3G systems. In other words, the UE may exclude 4G systems from the background scans. In some embodiments, avoidance of scanning 4G bands may lead to time and power savings.

HP-PLMN Scans According to OPLMN List

In some existing implementations, when a UE registers on a network, such as a public land mobile network (PLMN), that is configured as a lower priority network (e.g., a lower priority PLMN) according to an operator specified PLMN (OPLMN) list, which may specify one or more preferred PLMNs, the UE initiates a background scan to search for a network configured as a higher priority network according to the OPLMN list. The scan is independent of which radio access technology (RAT) the UE is currently registered on and is instead focused on finding a higher priority network according to the OPLMN list. For example, a UE may be camped on a lower priority network configured with a more preferred RAT (e.g., LTE) and may initiate a background scan for a higher priority network according to the OPLMN list that may be configured with a less preferred RAT (e.g., GSM or UMTS). Thus, when the UE finds a higher priority network, it may switch to a less preferred RAT, thereby downgrading user experience.

In other words, in order to provide service to a roaming UE from a higher priority network (PLMN), a service provider may not consider quality of service. For example, a service provider of a roaming UE may prefer network A with which only 3G (e.g., UMTS) or 2G (e.g., GSM) agreements exist. Additionally, the service provider may have another roaming partner operating network B with which LTE roaming exists. However, network B may be specified as a less preferred network in the OPLMN list. Thus, when the UE is registered on network B (with LTE roaming service), the UE may trigger a background scan (HP-PLMN scan) and, based on the OPLMN list, will move to the more preferred system, resulting in a degradation of service (due to the move from LTE to either 3G or 2G).

Thus, embodiments as described herein may allow a UE to consider the current serving RAT prior to initiating a background scan to find a higher priority network.

Figure 6:
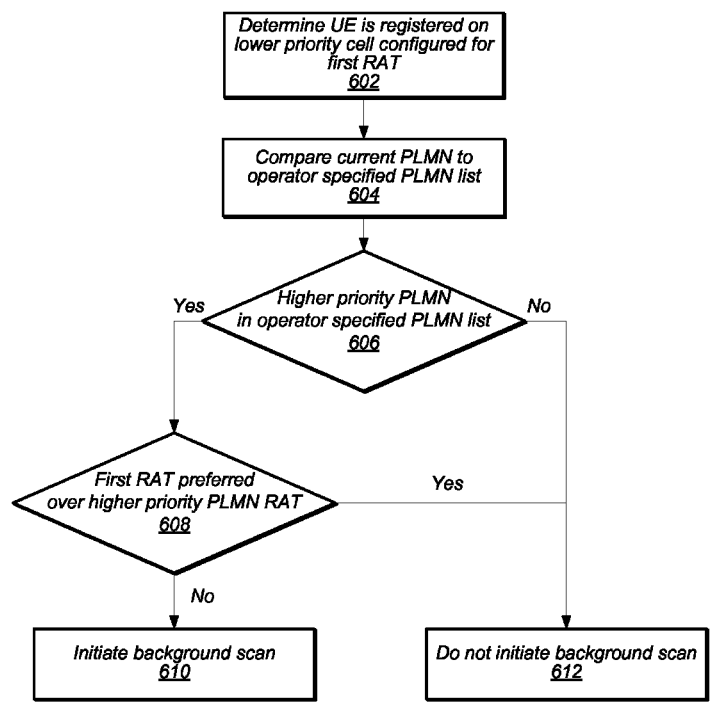
FIG. 6 is a flowchart diagram illustrating one embodiment of a method performed by a UE to determine when to perform a background scan while roaming.
Figure 7:
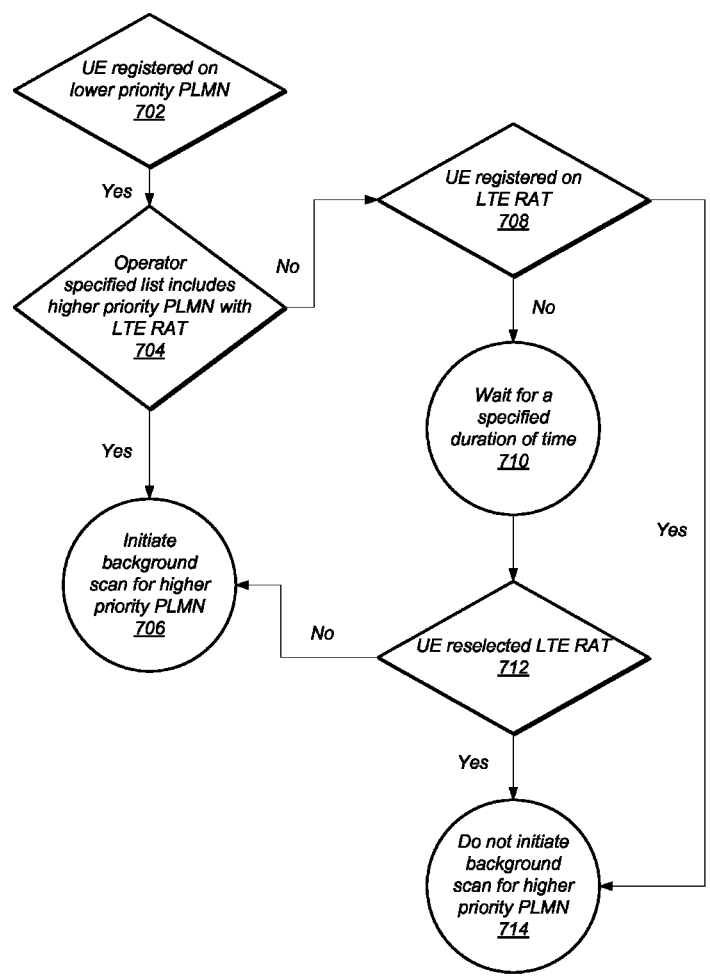
FIG. 7 is a flowchart diagram illustrating another embodiment of a method performed by a UE to determine when to perform a background scan while roaming.

FIGS. 6 and 7—Flowchart Diagrams

FIG. 6 is a flowchart diagram illustrating one embodiment of a method performed by a UE to determine when to perform a background scan while roaming. The method shown in FIG. 6 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 602, a user equipment device (UE) may determine if it is registered on a lower priority PLMN configured for a first radio access technology (RAT). The priority of the PLMN may be based on an OPLMN list stored on the UE. In some embodiments, the OPLMN list may be stored on a SIM (Subscriber Identity Module) of the UE. The term "SIM" or "SIM entity" is intended to include any of various types of SIM implementations or SIM functionality, such as one or more UICC(s) (Universal Integrated Circuit Card(s)), one or more eUICCs, one or more eSIMs, either removable or embedded, etc. In some embodiments, the first RAT may be LTE.

At 604, the UE may compare the lower priority PLMN (i.e., current PLMN) to the OPLMN list stored on the UE. Note that the OPLMN list may include one or more PLMNs and may assign a priority (or preference) to each PLMN in the OPLMN list. Additionally, the OPLMN list may include information regarding which RAT (e.g., LTE, GSM, UMTS, etc.) each PLMN in the OPLMN list is configured to implement (or use).

At 606, the UE may determine whether the OPLMN list includes at least one higher priority PLMN. If the OPLMN list includes at least one higher priority PLMN, the method may continue at 608. Otherwise, the method may continue at 612.

Continuing to 608, if the UE determines that at least one higher priority PLMN is included in the OPLMN list, the UE may further determine whether the first RAT is preferred over the RAT of the at least one higher priority PLMN. Note that in some embodiments, the UE may consider LTE as a most preferred RAT. Additionally, in some embodiments, the UE may prefer LTE over UMTS and UMTS over GSM. If the UE determines that the first RAT is preferred over the RAT of the at least one higher priority PLMN, the method may continue at 612. Otherwise, the method may continue at 610.

At 610, in response to determining that the first RAT is not preferred over the RAT of the at least one higher priority PLMN, the UE may initiate a background scan to search for the at least one higher priority PLMN according to the OPLMN list. Once the at least one higher priority PLMN is found, the UE may initiate a registration procedure to move to the higher priority PLMN.

At 612, in response to determining the first RAT is preferred over the RAT of the at least one higher priority PLMN, the UE may not initiate a background scan and may remain on the lower priority PLMN. In some embodiments, the UE may repeat the method as described herein once a timer has expired. In some embodiments, the timer may be a higher priority PLMN (HP-PLMN) scan timer.

FIG. 7 is a flowchart diagram illustrating another embodiment of a method performed by a UE to determine when to perform a background scan while roaming. The method shown in FIG. 7 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 702, the UE may determine whether it is registered on a lower priority PLMN based on an OPLMN list stored in a memory of the UE. In some embodiments, the UE may initiate step 702 when the UE is camped on a lower priority system configured to implement LTE and there is no entry in an OPLMN list for a higher priority PLMN configured to implement LTE. Additionally, or alternatively, the UE may initiate step 702 when the UE is camped on the lower priority PLMN and the lower priority PLMN is configured to implement LTE, and there is an entry in the OPLMN list for a higher priority PLMN configured to implement LTE.

Continuing to 704, the UE may determine whether the OPLMN list includes a higher priority PLMN configured to implement (or use) LTE. If the UE determines there is a higher priority PLMN configured to implement LTE in the OPLMN list, the method may continue at 706. Alternatively, if the UE determines there is not a higher priority PLMN configured to implement LTE in the OPLMN list, the method may continue at 708.

At 706, in response to determining there is a higher priority PLMN configured to implement LTE in the OPLMN list, the UE may initiate a background scan to find the higher priority PLMN.

At 708, in response to determining there is not a higher priority PLMN configured to implement LTE in the OPLMN list, the UE may determine whether it is registered on a PLMN configured to implement LTE. If the UE determines it is registered on a PLMN configured to implement LTE, the method may continue at 714. Alternatively, if the UE determines it is not registered on a PLMN configured to implement LTE, the method may continue at 710.

At 710, the UE may wait a specified duration of time. The specified duration of time may be based on an operator specified timer. The operator specified timer duration may be stored on a SIM card of the UE. Alternatively, or in addition, the specified duration of time may be based on a scan time of a HP-PLMN scan. Note that during the specified duration of time, the UE may select or reselect a PLMN configured to implement LTE.

At 712, after waiting the specified duration of time, the UE may determine whether a PLMN configured to implement LTE has been selected or reselected. If the UE determines that a PLMN configured to implement LTE has not been reselected (or selected), the method may continue at 706 and a background scan for a higher priority PLMN may be initiated. Alternatively, if the UE determines that a PLMN configured to implement LTE has been reselected (or selected), the method may continue at 714.

At 714, in response to determining that a PLMN configured to implement LTE has been reselected (or selected), the UE may not initiate a background scan for a higher priority PLMN and may remain on the PLMN configured to implement LTE. In some embodiments, the UE may repeat the method as described herein once a timer has expired. In some embodiments, the timer may be a higher priority PLMN (HP-PLMN) scan timer.

HP-PLMN Search Behavior

In some existing implementations, when a UE roams, there may be multiple service provider (operator) PLMNs on which the UE may roam. Additionally, to move from one PLMN to another PLMN, the UE executes background scans (HP-PLMN scans). However, in the absence of an OPLMN list, the background scans may have a longer duration and/or may consume more power as compared to a background scan according to an OPLMN list. Thus, the background scans may be skipped (since there are no preferred systems to search for) and the UE may only switch PLMNs manually.

Thus, embodiments as described herein may allow a UE to search for a PLMN configured to implement a more preferred RAT while roaming.

Figure 8:
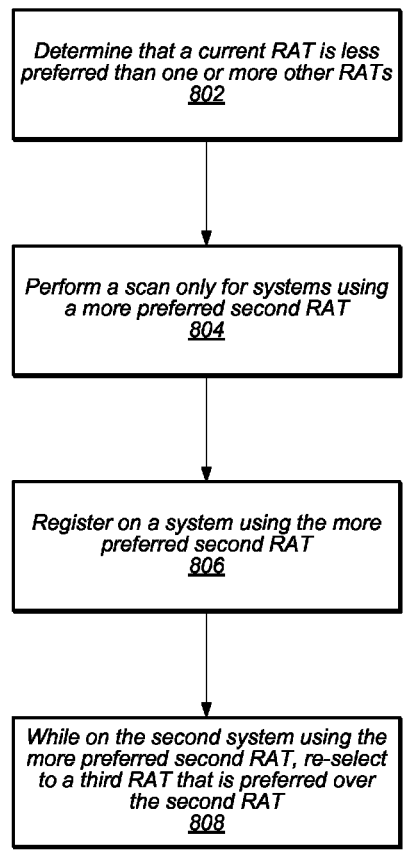
FIG. 8 is a flowchart diagram illustrating an embodiment of a method performed by a UE to determine when to perform a background scan for a more preferred RAT while roaming.
Figure 9:
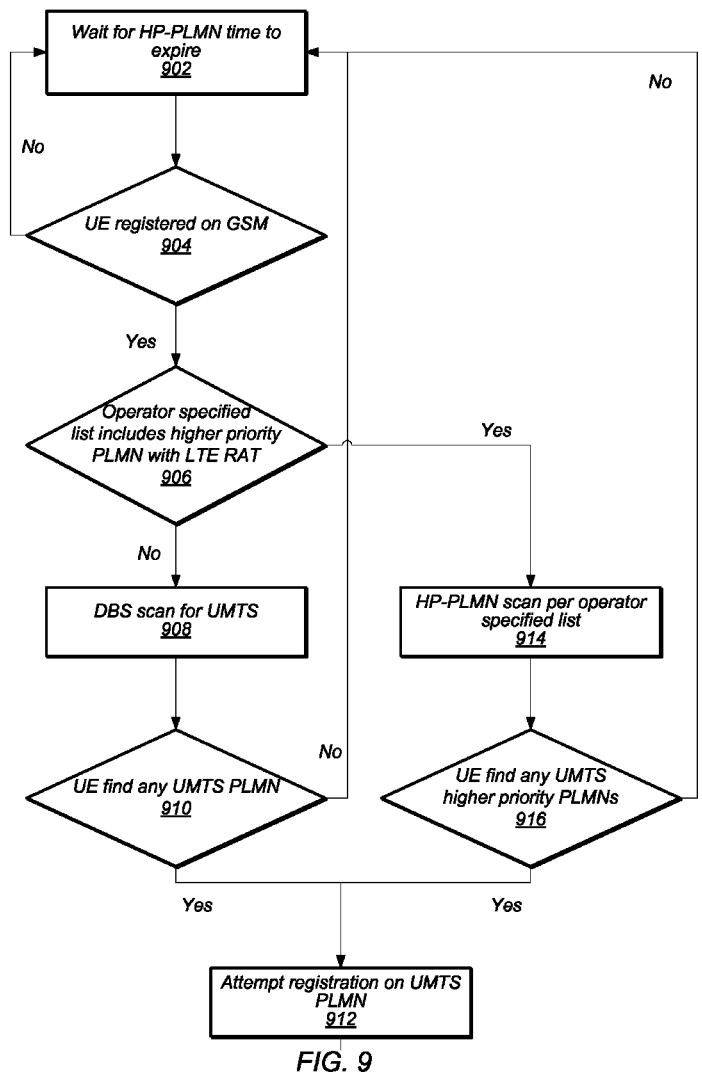
FIG. 9 is a flowchart diagram illustrating another embodiment of a method performed by a UE to determine when to perform a background scan for a more preferred RAT while roaming.

FIGS. 8 and 9—Flowchart Diagrams

FIG. 8 is a flowchart diagram illustrating an embodiment of a method performed by a UE to determine when to perform a background scan for a more preferred RAT while roaming. The method shown in FIG. 8 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 802, the UE may determine that a current radio access technology (RAT) is less preferred than one or more other RATs. In some embodiments, the UE may be roaming and may be registered and camped on a PLMN configured to implement (or use) the current RAT. The current RAT may be GSM in some embodiments. In some embodiments, the UE may register with the PLMN upon power up in a roaming location. Additionally, in some embodiments, the operator may not define a preferred system in the roaming location.

At 804, the UE may perform a scan (e.g., a DBS or HP-PLMN scan) for systems using, or configured to use (or implement), a more preferred second RAT. The scan may only be for systems using, or configured to use, the second RAT. In other words, the scan may be exclusively for systems using, or configured to use, the second RAT. In some embodiments, the second RAT may be UMTS.

At 806, the UE may register on a system using the second RAT, and at 808, while on the system using the second RAT, the UE may re-select to a third RAT that may be preferred over the second RAT. In some embodiments, the third RAT may be LTE. Additionally, in some embodiments, the re-selection may be via an access stratum layer of the second and/or third RAT.

FIG. 9 is a flowchart diagram illustrating an embodiment of a method performed by a UE to determine when to perform a background scan for a more preferred RAT while roaming. The method shown in FIG. 9 may be used in conjunction with any of the systems or devices shown in the above Figures, among other embodiments, some of the method elements shown may be performed concurrently, in a different order than shown, or may be omitted. Additional method elements may also be performed as desired. As shown, this method may operate as follows.

At 902, the UE may be idle and may wait for a HP-PLMN scan time (or timer) to expire. In some embodiments, the UE may be configured to perform a HP-PLMN scan periodically based on the HP-PLMN scan timer. Once the HP-PLMN scan time expires, the UE may proceed to step 904.

At 904, the UE may determine whether it is registered (or camped) on a PLMN configured to implement (or use) GSM. If the UE determines it is not registered on a PLMN configured to implement GSM, the method may return to step 902 and the UE may again wait for the HP-PLMN scan time to expire. Alternatively, if the UE determines it is registered on a PLMN configured to implement GSM, the method may continue at step 906.

At 906, the UE determine whether an OPLMN list stored on the UE (e.g., on a SIM of the UE) includes a higher priority PLMN configured to implement LTE. If the UE determines that the OPLMN list does not include a higher priority PLMN configured to implement LTE, the method may continue at 908. Alternatively, if the UE determines that the OPLMN list does include a higher priority PLMN configured to implement LTE, the method may continue at 914. Note that in some embodiments, the UE may not have an OPLMN list stored on the UE. In such embodiments, the method may continue at 908.

At 908, in response to determining that the OPLMN list does not include a higher priority PLMN configured to implement LTE, the UE may perform a full band scan on bands likely to be found in the last camped area (DBS scans) for PLMNs configured to implement UMTS. Note that in some embodiments, the UE may only scan for PLMNs configured to implement UMTS and may not scan for PLMNs configured to implement LTE in order to reduce scan time and conserve power. Additionally, in some embodiments, an operator may not have any roaming LTE agreements, thus if the UE searches for and finds PLMNs for which there are no roaming LTE agreements, registration by the UE may be rejected and overall search time may be increased.

At 910, the UE may determine whether any of the DBS scans found PLMNs configured to implement UMTS. If the UE found one or more PLMNs configured to implement UMTS, the method may continue at 912. Alternatively, if the UE did not find any PLMNs configured to implement UMTS, the method may return to step 902 and the UE may wait for a HP-PLMN time to expire.

At 912, the UE may attempt to register with at least one of the one or more PLMNs configured to implement UMTS found via the DBS scans. In some embodiments, once the UE registers with the at least one PLMN configured to implement UMTS, the UE may rely on a re-selection mechanism to move from UMTS to LTE. In some embodiments, such a re-selection mechanism (or method) may be implemented (or performed) at an access stratum layer.

At 914, in response to determining that the OPLMN list does include a higher priority PLMN configured to implement LTE, the UE may perform a HP-PLMN scan according to the OPLMN list stored on the UE. In some embodiments, the UE may only scan for OPLMNs configured to implement UMTS and may not scan for OPLMNs configured to implement LTE in order to reduce scan time and conserve power.

At 916, the UE may determine whether any of the HP-PLMN scans found OPLMNs configured to implement UMTS. If the UE found one or more OPLMNs configured to implement UMTS, the method may continue at 912 with the UE attempting to register on the higher priority PLMN in the OPLMN list. Alternatively, if the UE did not find any OPLMNs configured to implement UMTS, the method may return to step 902 and the UE may wait for a HP-PLMN time to expire.

Further Embodiments

In some embodiments, a UE (e.g., UE 106) may include at least one antenna for performing wireless communications, a radio coupled to the at least one antenna, and a processing element coupled to the radio. The UE may be configured to determine, based on a comparison of a current system on which the UE is camped to a preferred system list stored on the UE, that there is at least one higher priority system in the preferred system list and compare a first radio access technology (RAT) of the current system to a second RAT of the at least one higher priority system. Additionally, in response to determining that the first RAT is preferred compared to the second RAT, the UE may continue to camp on the current system without initiating a background scan for the higher priority system.

In some embodiments, the systems may be public land mobile networks (PLMNs) and the preferred system list may include an operator specified PLMN list (e.g., an operator PLNM (OPLMN) list). Additionally, the first RAT may be LTE and the second RAT may be GSM or UMTS. Also, priority of the first system and priority of the second system may each be based on a ranking of the first and second systems in the preferred systems list.

In some embodiments, in response to determining that the first RAT is not preferred compared to the second RAT, the UE may be also be configured to determine whether the second RAT is LTE. In response to determining that the second RAT is not LTE, wait a specified duration of time, determine whether the UE reselects to a third RAT, where the third RAT is LTE, and in response to determining the UE reselected to the third RAT, continue to camp on the third RAT without initiating a background scan for the at least one higher priority system. Alternatively, in response to determining that the second RAT is LTE, the UE may also be configured to initiate a background scan for the at least one higher priority system. Note that in some embodiments the specified duration of time may be based on a high priority PLMN (HP-PLMN) scan timer.

In some embodiments, the UE may be configured to determine that a lower priority system comprising a first radio access technology (RAT) is preferred over a higher priority system comprising a second RAT based on a comparison of the first and second RATs, and, in response to determining that the lower priority system is preferred, continue to camp on the lower priority system without initiating a background scan for the higher priority system. In some embodiments, priorities of the systems may be based on a preferred system list. Additionally, the systems may be public land mobile networks (PLMNs) and the preferred system list comprises an operator PLNM (OPLMN) list. Further, the first RAT may be LTE and the second RAT may be GSM or UMTS.

In some embodiments, the UE may be configured to determine that a first radio access technology (RAT) of a current system on which the UE is camped is less preferred than one or more other RATs and perform a scan, based on determining that the first RAT is less preferred, only for systems comprising a more preferred second RAT. In response to finding at least one system comprising the more preferred second RAT, the UE may be configured to register on the at least one system and reselect to a third RAT, the third RAT being preferred over the second RAT. In some embodiments, re-selecting may occur on an access stratum layer of the second and third RATs.

In response to not finding at least one system comprising the more preferred second RAT, the UE may be configured to wait a specified duration of time prior to repeating the scan. In embodiments, the first RAT may be GSM, the second RAT may be UMTS, and the third RAT may be LTE. The UE may also be configured to compare the current system to a list of preferred systems stored on the UE and perform the scan only for systems that comprise the more preferred second RAT and are in the list of preferred systems. In some embodiments, the scan may include a full band scan.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment (UE) device, comprising:
at least one antenna for performing wireless communications;
a radio coupled to the at least one antenna; and
a processing element coupled to the radio;
wherein the UE is configured to:
  initiate a background scan to upgrade radio access technology (RAT) while camped on a first system in response to an occurrence of a first condition, wherein the first system includes a first public land mobile network (PLMN) that operates according to a first RAT;
  determine that a second system includes a second PLMN that operates according to a second RAT, wherein the second system is included in one or more systems found during the background scan, and wherein the second RAT provides upgraded service as compared to the first RAT;
  determine whether an operator preferred data structure is empty, wherein, in response to determining that the operator preferred data structure is not empty, the UE is further configured to:
    group the one or more systems based on RAT type, wherein a first group includes RATs that do not provide an upgrade as compared to the first RAT, wherein a second group includes RATs that do provide an upgrade as compared to the first RAT, wherein the second system is included in the second group; and
    select the second system from the second group; and
  attempt to register on the second system based on the second PLMN operating according to the second RAT.

2. The UE of claim 1,
wherein the first PLMN has a first operator preference, wherein the second PLMN has a second operator preference different from the first operator preference, and wherein the first PLMN is preferred over the second PLMN based on the first and second operator preferences.

3. The UE of claim 1,
wherein the first RAT is a second generation (2G) RAT, wherein the second RAT is a third generation (3G) RAT.

4. The UE of claim 1,
wherein the UE is further configured to detect the occurrence of the first condition, wherein to detect the occurrence, the UE is further configured to detect one or more of:
the UE is in a roaming condition;
operation of the UE in an automatic PLMN selection mode;
a data roaming setting of the UE is enabled; or
the UE is camping on a second generation (2G) visiting PLMN.

5. The UE of claim 1,
wherein, in response to determining that the operator preferred data structure is empty, the UE is further configured to:
determine whether the one or more systems only operate according to RATs that provide upgraded service as compared to the first RAT;
wherein in response to determining that the one or more systems operate according to RATs that provide upgraded service and RATs that do not provide upgraded service, the UE is configured to:
  compare signal quality for only the one or more systems that include RATs that provide upgraded service, wherein the second system has a higher signal quality than each of the other one or more systems that operate according to RATs that provide upgraded service; and
  select the second system to attempt registration on based at least in part on that the second system operates according to a RAT that provides upgraded service and the higher signal quality.

6. The UE of claim 5,
wherein in response to determining that the one or more systems only operate according to RATs that provide upgraded service, the UE is configured to:
   compare signal quality for each of the one or more systems, wherein the second system has a higher signal quality than each of the other one or more systems; and
   select the second system to attempt registration on based at least in part on the higher signal quality.

7. The UE of claim 1,
wherein, in response to determining that the operator preferred data structure is empty, the UE is further configured to:
   limit a number of background scans attempted over a specified period of time.

8. The UE of claim 1,
wherein if the attempt to register on the second system fails, the UE is further configured to:
   return to camping on the first system; and
   wait a specified period of time before re-attempting registration on the second system.

9. The UE of claim 8,
wherein the UE is further configured to:
   determine motion status of the UE; and
   in response to determining that the UE is approximately stationary, not re-attempting registration upon the expiration of the specified period of time.

10. A non-transitory computer accessible memory medium comprising program instructions which, when executed at a wireless user equipment (UE) device, cause the UE to:
   initiate a background scan to upgrade radio access technology (RAT) while camped on a first system in response to an occurrence of a first condition, wherein the first system includes a first public land mobile network (PLMN) that operates according to a first RAT;
   determine that a second system includes a second PLMN that operates according to a second RAT, wherein the second system is included in one or more systems found during the background scan, and wherein the second RAT provides upgraded service as compared to the first RAT;
   determine whether an operator preferred data structure is empty, wherein, in response to determining that the operator preferred data structure is not empty, the program instructions, when executed by the UE, further cause the UE to:
      group the one or more systems based on RAT type, wherein a first group includes RATs that do not provide an upgrade as compared to the first RAT, wherein a second group includes RATs that do provide an upgrade as compared to the first RAT, wherein the second system is included in the second group; and
      select the second system from the second group; and
   attempt to register on the second system based on the second PLMN operating according to the second RAT.

11. The non-transitory computer accessible memory medium of claim 10,
wherein the first PLMN has a first operator preference, wherein the second PLMN has a second operator preference different from the first operator preference, and wherein the first PLMN is preferred over the second PLMN based on the first and second operator preferences.

12. The non-transitory computer accessible memory medium of claim 10,
wherein the first RAT is a second generation (2G) RAT, wherein the second RAT is a third generation (3G) RAT.

13. The non-transitory computer accessible memory medium of claim 10,
wherein the program instructions, when executed by the UE, further cause the UE to detect the occurrence of the first condition, wherein to detect the occurrence, the UE is further configured to detect one or more of:
   the UE is in a roaming condition;
   operation of the UE in an automatic PLMN selection mode;
   a data roaming setting of the UE is enabled; or
   the UE is camping on a second generation (2G) visiting PLMN.

14. The non-transitory computer accessible memory medium of claim 10,
wherein, in response to determining that the operator preferred data structure is empty, the program instructions, when executed by the UE, further cause the UE to:
   determine whether the one or more systems only operate according to RATs that provide upgraded service as compared to the first RAT;
   wherein in response to determining that the one or more systems operate according to RATs that provide upgraded service and RATs that do not provide upgraded service, the program instructions, when executed by the UE, further cause the UE to:
      compare signal quality for only the one or more systems that operate according to RATs that provide upgraded service, wherein the second system has a higher signal quality than each of the other one or more systems that operate according to RATs that provide upgraded service; and
      select the second system to attempt registration on based at least in part on that the second system operates according to a RAT that provides upgraded service and the higher signal quality.

15. The non-transitory computer accessible memory medium of claim 14,
wherein in response to determining that the one or more systems only operate according to RATs that provide upgraded service, the program instructions, when executed by the UE, further cause the UE to:
   compare signal quality for each of the one or more systems, wherein the second system has a higher signal quality than each of the other one or more systems; and
   select the second system to attempt registration on based at least in part on the higher signal quality.

16. The non-transitory computer accessible memory medium of claim 10,
wherein the program instructions, when executed by the UE, further cause the UE to:
   determine, based on a comparison of the first system on which the UE is camped to an operator preferred system list stored on the UE, that there is at least one higher priority system in the preferred system list;
   compare the first RAT to a third RAT of the at least one higher priority system; and
   in response to determining that the first RAT is preferred compared to the third RAT, continue to camp on the first system without initiating a background scan for the higher priority system.

17. The non-transitory computer accessible memory medium of claim 10,
wherein the program instructions, when executed by the UE, further cause the UE to:
determine that the first system on which the UE is camped is a lower priority system than a third system operating according to a third RAT, wherein system priorities are determined using an operator preference list, and wherein the first RAT is preferred by the UE over the third RAT; and
in response to determining that the first RAT is preferred by the UE over the third RAT, continue to camp on the first system without initiating a background scan for the higher priority system.

18. A method for operating a wireless user equipment (UE) device, the method comprising:
by the UE:
initiating a background scan to upgrade radio access technology (RAT) while camped on a first system in response to an occurrence of a first condition, wherein the first system includes a first public land mobile network (PLMN) that operates according to a first RAT;
determining a second system includes a second PLMN that operates according to a second RAT, wherein the second system is included in one or more systems found during the background scan, and wherein the second RAT provides upgraded service as compared to the first RAT;
determining whether an operator preferred data structure is empty, wherein, in response to determining that the operator preferred data structure is not empty, the method further comprises, the UE:
grouping the one or more systems based on RAT type, wherein a first group includes RATs that do not provide an upgrade as compared to the first RAT, wherein a second group includes RATs that do provide an upgrade as compared to the first RAT, wherein the second system is included in the second group; and
selecting the second system from the second group; and
attempting to register on the second system based on the second PLMN operating according to the second RAT.

19. The method of claim 18, further comprising:
by the UE:
determining that the first RAT is less preferred than one or more other RATs;
performing a background scan, based on determining that the first RAT is less preferred, only for systems that operate according to a more preferred third RAT;
in response to finding at least one system that operates according to the more preferred second RAT, registering the UE on the at least one system; and
reselecting to a fourth RAT, wherein the fourth RAT is preferred over the third RAT.

20. The method of claim 18, further comprising:
by the UE:
detecting the occurrence of the first condition, wherein detecting the occurrence comprises detecting one or more of:
the UE is in a roaming condition;
operation of the UE in an automatic PLMN selection mode;
a data roaming setting of the UE is enabled; or
the UE is camping on a second generation (2G) visiting PLMN.

21. The method of claim 18,
wherein, in response to determining that the operator preferred data structure is empty, the method further comprises the UE:
determining whether the one or more systems only operate according to RATs that provide upgraded service as compared to the first RAT;
wherein in response to determining that the one or more systems operate according to RATs that provide upgraded service and RATs that do not provide upgraded service, the method further comprises the UE:
comparing signal quality for only the one or more systems that include RATs that provide upgraded service, wherein the second system has a higher signal quality than each of the other one or more systems that operate according to RATs that provide upgraded service; and
selecting the second system to attempt registration on based at least in part on that the second system operates according to a RAT that provides upgraded service and the higher signal quality.

22. The method of claim 18,
wherein, in response to determining that the operator preferred data structure is empty, the method further comprises the UE:
limiting a number of background scans attempted over a specified period of time.

23. The method of claim 18,
wherein the first PLMN has a first operator preference, wherein the second PLMN has a second operator preference different from the first operator preference, and wherein the first PLMN is preferred over the second PLMN based on the first and second operator preferences.

* * * * *

UNITED STATES PATENT AND TRADEMARK OFFICE
CERTIFICATE OF CORRECTION

PATENT NO.         : 9,525,995 B2                              Page 1 of 1
APPLICATION NO.    : 14/732765
DATED              : December 20, 2016
INVENTOR(S)        : Emmanuel Grenier-Raud et al.

It is certified that error appears in the above-identified patent and that said Letters Patent is hereby corrected as shown below:

In the Claims

Claim 9, Column 21, Lines 27-28, please delete "the expiration" and substitute -- an expiration --

Signed and Sealed this
Ninth Day of May, 2017

Michelle K. Lee
*Director of the United States Patent and Trademark Office*